United States Patent
Lin

(10) Patent No.: US 7,131,763 B2
(45) Date of Patent: Nov. 7, 2006

(54) DISPLAY

(75) Inventor: Shue-Liang Lin, Taipei (TW)

(73) Assignee: AU Optronics Corp., Hsinchu (TW)

( * ) Notice: Subject to any disclaimer, the term of this patent is extended or adjusted under 35 U.S.C. 154(b) by 41 days.

(21) Appl. No.: 11/086,325

(22) Filed: Mar. 23, 2005

(65) Prior Publication Data

US 2005/0259443 A1 Nov. 24, 2005

(30) Foreign Application Priority Data

May 18, 2004 (TW) .............................. 93113964 A

(51) Int. Cl.
*F21V 7/10* (2006.01)
(52) U.S. Cl. .................. 362/609; 362/617; 362/619; 362/633; 362/369; 362/390
(58) Field of Classification Search ................ 362/602, 362/603, 608, 609, 617, 618, 619, 632, 633, 362/634, 369, 390
See application file for complete search history.

(56) References Cited

U.S. PATENT DOCUMENTS

| 6,853,410 | B1* | 2/2005 | Matsuda et al. | 349/67 |
| 6,945,684 | B1* | 9/2005 | Chen et al. | 362/561 |
| 6,962,430 | B1* | 11/2005 | Ito et al. | 362/634 |
| 6,976,781 | B1* | 12/2005 | Chu et al. | 362/633 |
| 6,977,694 | B1* | 12/2005 | Natsuyama | 349/60 |
| 2003/0123258 | A1* | 7/2003 | Nitto et al. | 362/373 |

* cited by examiner

Primary Examiner—Thomas M. Sember
(74) Attorney, Agent, or Firm—Troxell Law Office, PLLC

(57) ABSTRACT

A display comprises a panel, a light-guide plate, a lamp, and a back-bezel. The light-guide plate has a back-end, a front-end, an upper-surface, and a bottom-surface. The upper-surface faces the panel. The lamp is disposed at the back-end. The light generated from the lamp enters the light-guide plate through the back-end and leaves for the panel through the upper-surface. The back-bezel is used for housing the lamp, the light-guide plate and the panel, wherein an adhesive tape is disposed between the back-bezel and the front-end of the light-guide plate. Also, a cushion is disposed on the light-guide plate and the back-bezel, to carry the panel.

8 Claims, 4 Drawing Sheets

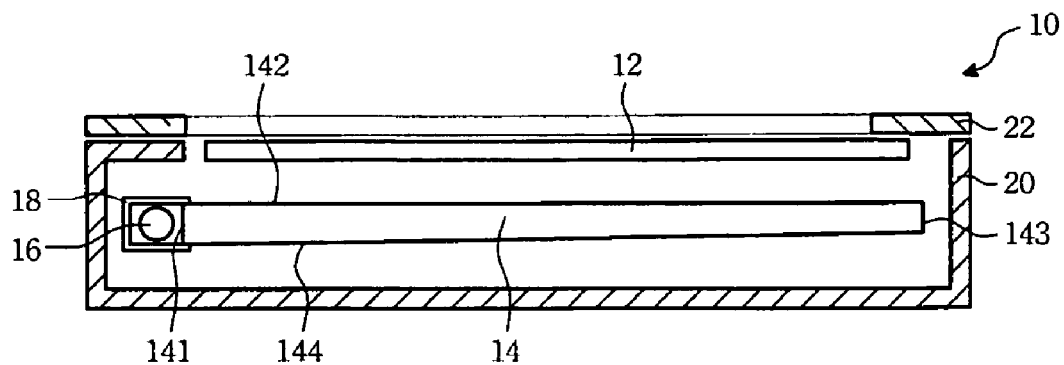
Fig. 1 (Prior Art I)
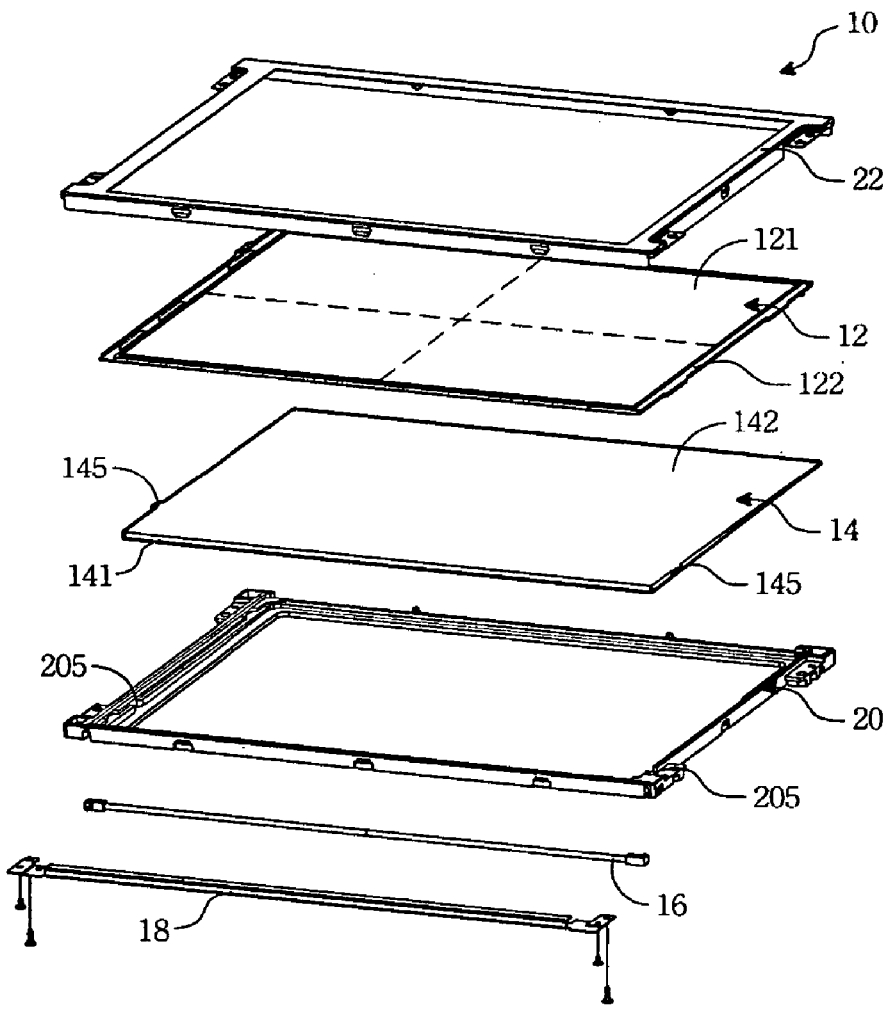
Fig. 2A (Prior Art I)

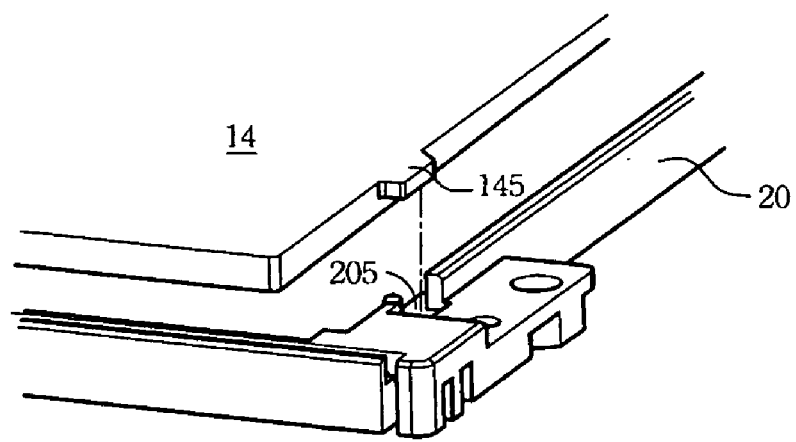
Fig. 2B (Prior Art I)
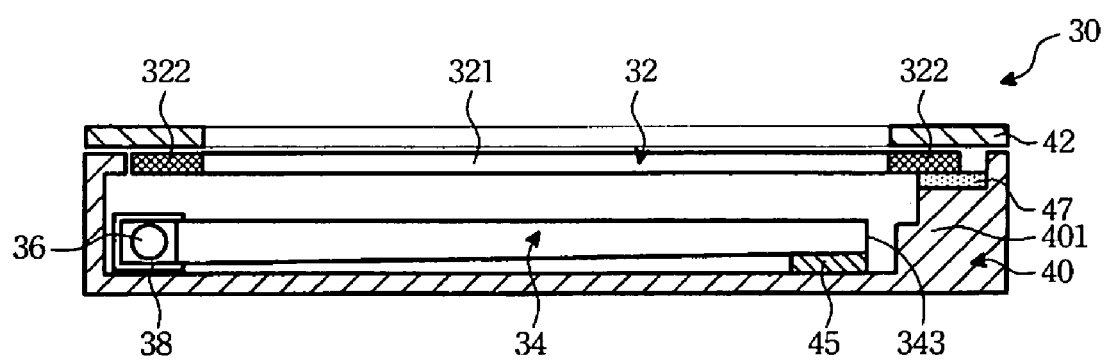
Fig. 3A (Prior Art II)

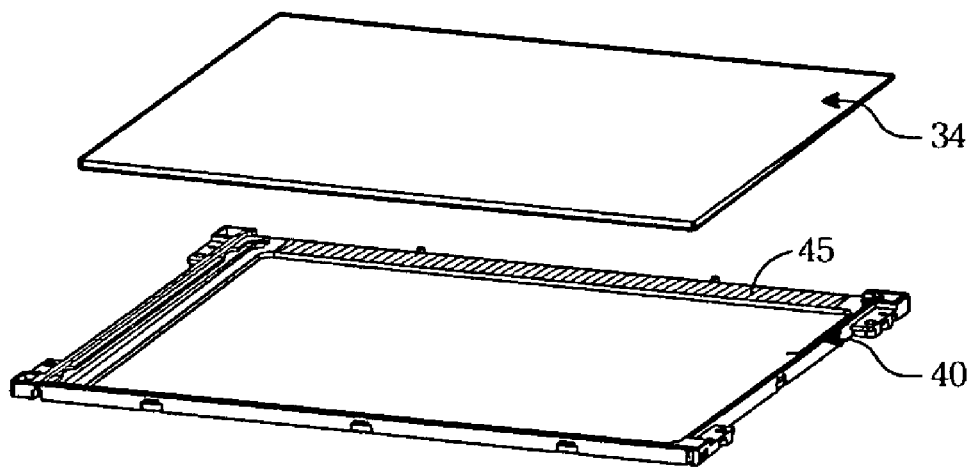
Fig.3B (Prior Art II)
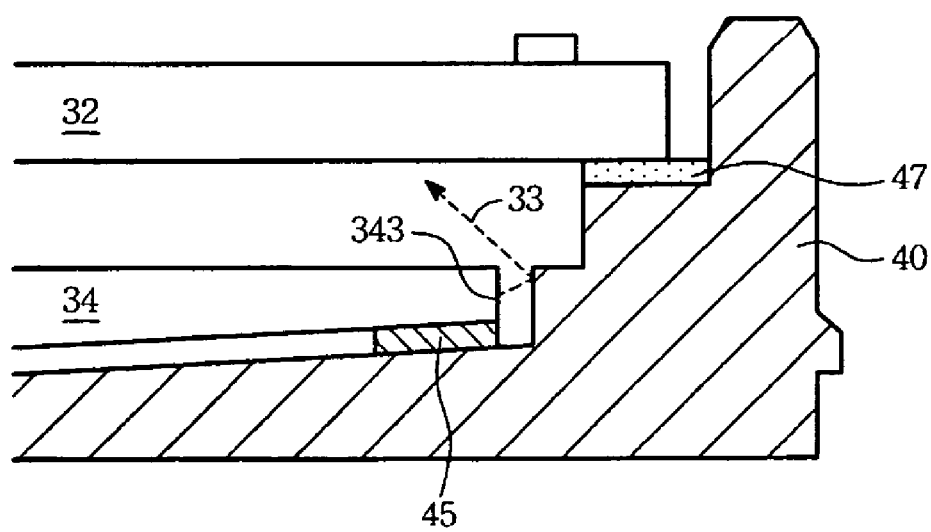
Fig.3C (Prior Art II)

DISPLAY

FIELD OF THE INVENTION

The invention relates to a display. More particularly, the invention relates to a display that is anti-vibration and capable of avoiding light leakages.

BACKGROUND OF THE INVENTION

FIG. 1 shows a conventional cross section view of a display of Prior Art I. The conventional display 10 comprises a panel 12, a light-guide plate 14, a lamp 16, a lamp-reflector 18, a back-bezel 20, and a front-frame 22.

The panel 12 is a non-irradiation display device that needs the light-guide plate 14 to provide a backlight source so as to present images. The panel 12 further comprises a color filter, a liquid crystal layer and a TFT (thin film transistor) array. The TFT array controls tilt angles of the liquid crystal molecules so as to modulate the brightness of the light from the light-guide plate 14. The color filter determines what particular colors should be given out through the panel 12.

Under the panel 12 is a light-guide plate 14, which has a back-end 141, a front-end 143, an upper-surface 142 and a bottom-surface 144. The upper-surface 142 faces the panel 12. The bottom-surface 144 is designed to have a protrusion pattern, which spread the light evenly from the light-guide plate 14.

The lamp 16 is disposed at the back-end 141. The lamp-reflector 18 is disposed outside the lamp 16 for shielding and reflecting purposes. In a typical display 10, a cold cathode fluorescent tube (CCFL) is usually used as the lamp 16. Light emitted from the lamp 16 is led into the light-guide plate 14 through the back-end 141. As mentioned above, the lamp-reflector 18 is significant in various manifolds. First, reflectivity of the lamp-reflector 18 can converge the light generated from the lamp 16 at the back-end 141. Second, the C-shape lamp-reflector 18 as shown can mount thereinside the lamp 16 and the back-end 141 of the light-guide plate 14 nicely and tightly. The lamp-reflector 18 and the back-bezel 20 can be fixed by proper joining means such as like a screw-and-hole pair, or an anchoring bolt-and-slot pair. With the help of the lamp-reflector 18, the light-guide plate 14 inside the back-bezel 20 can be fixed at the back-end 141.

In the last stage of assembly, the front-frame 22 and the back-bezel 20 can be joined and fixed to complete the display 10.

Referring to FIG. 2A, an explosion diagram of the display 10 of Prior Art I is shown. It is well known in the art that, before shipping, the display 10 must go through a series of strict impact tests. To pass the impact tests, the display 10 has a side-protrusion structure 145 on both sides of the light-guide plate 14 for pairing respective ditches 205 at the back-bezel 20. As shown in FIG. 2B, the match of the side-protrusion structure 145 and the ditch 205 can be easily seen.

As shown in FIG. 2A, the panel 12 can be divided into a active area 121 and an non-active area 122, in which the active area 121 locates at the middle portion of the panel 12 for displaying images thereon. The non-active area 122 is located at the margin of the panel 12 and coated with a light-absorptive material so as to allow the light to be transmitted only through the active area 121 of the panel 12. The front-frame 22 is mounted on top of the non-active area 122.

In the assembly of the display 10, the light-guide plate 14 is rested underneath the panel 12, with the side-protrusion structure 145 covered by the non-active area 122 for avoiding possible light intrusion. Despite the light protection provided by the arrangement of the light-guide plate 14 and the non-active area 122, possible light scattering is still possible at the portion of the active area 121 near side-protrusion structure 145. Such a phenomenon is known as the "light leakage", which would cause an uneven distribution of brightness and damage the image quality of the display 10.

In order to improve the problem of the aforesaid light leakages in Prior Art I, more and more display panels remove the side-protrusion structures 145 on the light-guide plates. Referring to FIG. 3A, a cross section view of a display of the Prior Art II is shown. The display 30 comprises a panel 32, a light-guide plate 34, a lamp 36, a lamp-reflector 38, a back-bezel 40 and a front-frame 42. The panel 32 can be divided into a active area 321 and the non-active area 322. Since most of the devices like Prior Art II are similar to those in Prior Art I, only different devices shall be discussed in the following paragraphs.

Major difference between the Prior Art I and the Prior Art II is that the light-guide plate 34 of the Prior Art II does not have the side-protrusion structure as mentioned in the Prior Art I. In addition, as shown in FIG. 3B, no ditch inside the back-bezel 40 is shown. In order to increase the stability of light-guide plate 34, an adhesive tape 45 to substitute the side-protrusion structure 145 and the ditch 205 in FIG. 2A is applied between the front end 343 of the light-guide plate 34 and the back bezel 40.

As shown in FIG. 3A, the back-bezel 40 has a stair-like structure 401 facing the front-end 343 of the light-guide plate 343. The panel 32 mounts on top of the stair-like structure 401 with a rubber cushion 47 in between.

Although the brightness of Prior Art II is more evenly distributed than that is in Prior Art I, yet the performance of the Prior Art II in anti-vibration is weaker. In the Prior Art II; for the adhesive tape 45 is limited in size, the tape 45 cannot definitely provide sufficient forcing to adhere the light-guide plate 34 onto the back-bezel 40. In particular, in the impact test, the light-guide plate 34 of the display 30, could pound on the lamp 36, or evenly break the lamp 36. Also, the cushion 47 with such a thickness is unable to absorb/blot out all the vibration or shock. Moreover, referring to FIG. 3C, some light (shown as 33) would be reflected by the back-bezel 40 near the front-end 343, which in turns would worsen the light leakages and the image quality of the display.

And so, for those who are devoted in the art of displays and the related fields of industry, to overcome the aforesaid weaknesses is definitely an important task in improving the quality of the displays.

SUMMARY OF THE INVENTION

Accordingly, one major object of the present invention is to provide a display, which can avoid light leakages, display its brightness evenly, and thereby enhance the quality of the image displayed.

Another object of the present invention is to provide a display that can present a better quality in preventing from accidental crashes.

In addition, it is a further object of the present invention to provide a solid and stable display, with which, even under strong impacts, the light-guide plate would not pound on the lamp to cause any further interior damage.

A display comprises a panel, a light-guide plate, a lamp, and a back-bezel. The light-guide plate has a back-end, a front-end, an upper-surface, and a bottom-surface. The upper-surface is posed to face the panel. A lamp is disposed at the back-end. The light generated from the lamp enters the light-guide plate through the back-end and leaves for the panel through the upper-surface. A back-bezel is needed for housing the lamp, the light-guide plate and the panel, in which an adhesive tape is disposed between the back-bezel and the bottom-surface of the light-guide plate, especially near the front-end of the light-guide plate. Besides, a cushion is disposed on both of the upper-surface of the light-guide plate and the back-bezel to carry the panel.

Advantages of the present invention are 1) to prevent light leakages on the panel, and 2) to intensify the anti-vibration protection so as to enhance the overall stability of the display; such that, even under strong crashes, the light-guide plate would not strike on lamp to cause any further damage inside.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 shows a conventional cross section view of a display of Prior Art I.;

FIG. 2A shows an explosion diagram of the display of Prior Art I;

FIG. 2B illustrates how the side-protrusion structure fit into the ditch;

FIG. 3A shows a cross-section view of a display of Prior Art II;

FIG. 3B shows the light-guide plate and the back-bezel of FIG. 3A;

FIG. 3C shows the light path near the front end of the light-guide plate in FIG. 3A;

DETAILED DESCRIPTION OF THE PREFERRED EMBODIMENT

Figure 4A:
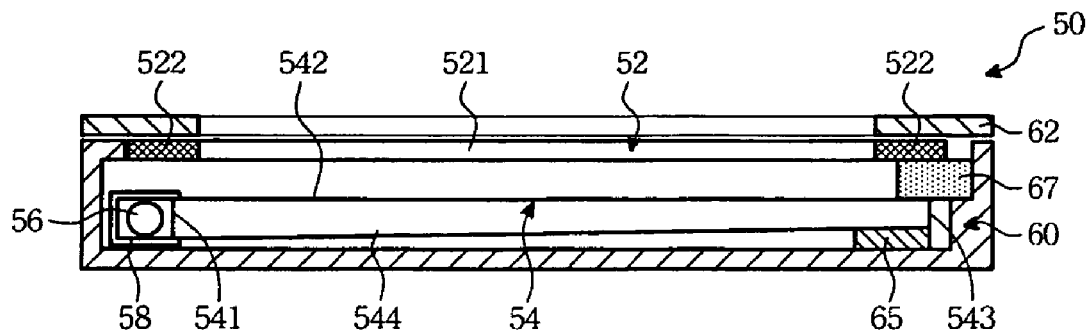
FIG. 4A shows a cross-section view of a display of the present invention.

FIG. 4A shows a cross section view of a display of the present invention. The display 50 comprises a panel 52, a light-guide plate 54, a lamp 56, a lamp-reflector 58, a back-bezel 60 and a front frame 62.

The panel 52 is a non-irradiation display device that needs a light-guide plate 54 to provide a backlight source for imaging. The panel 52 comprises a color filter, a liquid crystal layer and a TFT (Thin film transistor) array. The TFT array controls tilt angles of the liquid crystal molecules for modulating the brightness of the light from the light-guide plate 54. The color filter determines what particular colors shall be given out through the panel 52. The panel 52 can be divided into a active area 521 and an non-active area 522. The active area 521 locates at the middle part of the panel 52. With the light provided by the light-guide plate 54, images can be displayed in the active area 521. The non-active area 522 is located at the margin of the panel 52. A light-absorptive material is coated on the non-active area 522 so that light can only be transmitted through the active area 521.

Underneath the panel 52 locates a light-guide plate 54, which has a back-end 541, a front-end 543, an upper-surface 542 and a bottom-surface 544. The upper-surface 542 faces the panel 52. The bottom-surface 544 is designed to have a protrusion pattern, which distributes evenly the light from the light-guide plate 54. For instance, a preferred embodiment of the light-guide plate 54 can apply a V-cut light-guide plate, which has a V-groove pattern on its bottom-surface 544.

The lamp 56 is disposed at the back-end 541, whereas the lamp-reflector 58 is disposed to cover the lamp 56. The lamp-reflector 58 has two significances. First, the reflectivity of the lamp-reflector 58 ensures the light generated from the lamp 56 to be converged into the back-end 541. Second, the C-shape lamp-reflector 58, preferably, can also be used to hold the back-end 541 of the light-guide plate 54 nicely and tightly. The lamp-reflector 58 and the back-bezel 60 are connected by joining means like a screw-and-hole pair or an anchoring bolt-and-slot pair.

The back-bezel 60 is needed for housing the lamp 56, the light-guide plate 54 and the panel 52. As mentioned above, the back-end 541 of the light-guide plate 54 is connected with the back-bezel 60 through the lamp-reflector 58. An adhesive tape 65 is disposed between the back-bezel 60 and the bottom-surface 544 of the light-guide plate 54 for providing adhering in between. The adhesive tape 65 is disposed near the front-end 543 of the light-guide plate 54 in some embodiments of the present invention.

It is noted that the stair-like structure showed in FIG. 3A does not appear in the present invention. In the present invention, the cushion 53 disposed on both of the light-guide plate 54 and the back-bezel 60 is included to carry directly the panel 52. Preferably, an embodiment of the cushion 67 is made of a rubber.

Finally, fabrication of the panel 52 is completed by joining the front-frame 62 and the back-bezel 60. In some embodiments, the front-frame 62 and the back-bezel 60 can be joined by utilizing joining means like a screw-and-hole pair or an anchoring bolt-and-slot pair. As illustrated in FIG. 4A, the front-frame 62 is disposed on the non-active area 522 of the panel 52.

Compare FIG. 4A with FIG. 3A to further understand the advantages of the present invention. The panel 32 of Prior Art II is mainly carried by the stair-like structure of the back-bezel 40, in which the conventional cushion 47 can only prevent the panel 32 from sliding but cannot absorb/blot out possible vibrations or shocks toward the panel 32. Since the back-bezel 60 of the present invention has no such stair-like structure, the back-bezel 60 would have a bigger space to contain a bigger light-guide plate 54. Hence, the adhesive tape 65 under the front-end 543 of the light-guide plate 54 would have a bigger adhesive area than the conventional adhesive tape 45. As a result, the light-guide plate 54 is adhered with the back-bezel 60 much more tightly.

In addition, in a preferred embodiment, an extra adhesive tape can be applied under the cushion 67 so as to have the cushion 67 firmly fixed on the upper-surface 542 of the light-guide plate 54. As a result, the light-guide plate 54 would have a much bigger adhesive area for double-face adhering. By comparing the adhesive areas of the present invention and Prior Art II, it is obvious that the present invention is more capable of securing the light-guide plate 54 inside the display panel 50.

Moreover, in the present invention (referring to FIG. 4A), the front-frame 62 and the back-bezel 60 are joined and fixed such that the light-guide plate 54, the cushion 67 and the panel 52 can be held together near the front-end 543. Yet looking back as the problematic Prior Art II, the only panel 32 is held, while others do not show any particular fastening.

The present invention seeks not only to carry and adhere the light-guide plate 54 in the display 50, but also to hold it. Thereby, the stability of the panel 52 and the performance of the light-guide plate 54 against sliding are improved.

The present invention uses a thicker cushion 67 for carrying the panel 52; more particularly, for carrying the non-active area 522 of the panel 52. Hence, the optical property of the active area 521 would not be affected. Furthermore, a sufficient thickness of the cushion 67 can not only prevent the sliding of the panel 52, but also can have a better anti-vibration capability. Because of a thicker cushion 67, the display 50 of the present invention is able to pass a stricter impact test without causing any significant damage on the panel 52. It is clear to see that the present invention has successfully improved over the Prior Art II in anti-vibration protection.

Figure 4B:
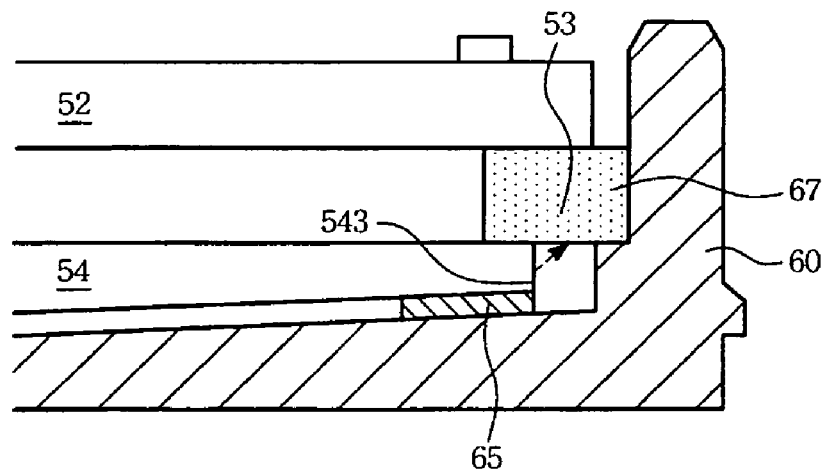
FIG. 4B shows the light path near the front end of the light-guide plate in FIG. 4A.

FIG. 4B shows the light path near the front-end 543 of the light-guide plate 54 of FIG. 4A. Other than the anti-vibration design mentioned above, the cushion 67 of the present invention could further avoid light leakages, which happen in the prior arts. As shown in FIG. 4B, a light 53 emits from the front-end 543 of the light-guide plate 54, and then it would be reflected by the back-bezel 60. However, with the cushion 67 above the light-guide plate 54, the light 53 reflected by the back-bezel 60 would be blocked out so as to avoid the light 53 to be emitted to the panel 52. Comparing to FIG. 3C, the cushion 67 of the present invention is capable of blocking out the light 53 and thus no light leakage can be seen in this present invention. Further, in the present invention, a light-absorptive material can be applied to the cushion 67, so as to enhance its ability to block the light 53.

With all the embodiments and detailed descriptions of the present invention that are mentioned above, the present invention can 1) prevent light leakages on the panel and 2) intensify the anti-vibration ability to enhance the overall stability of the display; so that even under strong crashes or vibrations, the light-guide plate would not strike on lamp to cause any further damage inside.

As understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

While the preferred embodiment of the invention has been illustrated and described, it will be appreciated that various changes and modifications can be made therein without departing from the spirit and scope of the invention.

What is claimed is:

1. A display, comprising:
   a panel;
   a light-guide plate having a back-end, a front-end, a upper-surface, and a bottom-surface, wherein the upper-surface faces the panel;
   a lamp disposed at the back-end of the light-guide plate, wherein the light generated by the lamp enters the light-guide plate through the back-end and leaves for the panel through the upper-surface; and
   a back-bezel for housing the lamp, the light-guide plate and the panel, wherein an adhesive tape is disposed between the back-bezel and the bottom-surface of the light-guide plate, wherein a cushion is disposed on both of the light-guide plate and the back-bezel to carry the panel.

2. The display according to claim 1, further comprising a lamp-reflector covering the lamp so as to reflect the light generated by the lamp into the back-end of the light-guide plate.

3. The display according to claim 2, wherein the light-guide plate is fixed at the back-bezel by the lamp-reflector.

4. The display according to claim 1 further comprising a front-frame, which is disposed on the panel and is fixed at the back-bezel.

5. The display according to claim 1, wherein the cushion is made of rubber material.

6. The display according to claim 1, wherein the panel is further divided into a active area and an non-active area, said non-active area of the panel being carried by the cushion.

7. The display according to claim 1, wherein the light-guide plate is a V-cut light-guide plate.

8. The display according to claim 1, wherein the adhesive tape is disposed near the front-end of the light-guide plate.

* * * * *